(12) United States Patent
Schubert et al.

(10) Patent No.: US 9,040,133 B2
(45) Date of Patent: May 26, 2015

(54) ARTICLE, MORE PARTICULARLY HOSE, MORE PARTICULARLY AGAIN CHARGE-AIR HOSE, WITH AN EMBEDDED REINFORCEMENT BASED ON A POLYOXADIAZOLE

(71) Applicant: ContiTech Schlauch GmbH, Hannover (DE)

(72) Inventors: Horst Schubert, Woelpinghausen (DE); Ulrich Brettschneider, Osterode (DE)

(73) Assignee: ContiTech Schlauch GmbH, Hannover (DE)

( * ) Notice: Subject to any disclaimer, the term of this patent is extended or adjusted under 35 U.S.C. 154(b) by 10 days.

(21) Appl. No.: 13/675,815

(22) Filed: Nov. 13, 2012

(65) Prior Publication Data

US 2013/0068337 A1    Mar. 21, 2013

Related U.S. Application Data

(63) Continuation of application No. PCT/EP2011/058019, filed on May 18, 2011.

(30) Foreign Application Priority Data

Jul. 1, 2010 (DE) .......................... 10 2010 017 679

(51) Int. Cl.
*B29D 22/00* (2006.01)
*B29D 23/00* (2006.01)
(Continued)

(52) U.S. Cl.
CPC ............ *F16L 11/02* (2013.01); *Y10T 428/1362* (2015.01); *Y10T 428/1366* (2015.01);
(Continued)

(58) Field of Classification Search
CPC ......... F16L 11/02; F16L 11/08; F16L 11/082; F16L 11/085; C08J 5/046; C08J 5/047; F02B 33/44; F02M 35/10091; F02M 35/10334; F02M 35/10157; D03D 1/00; D03D 19/00; D04B 21/00; D04C 1/02; D04H 13/00; C08K 7/02; Y10T 428/1362; Y10T 428/1366
USPC ......... 428/36.3; 442/341–343, 353, 197, 199, 442/208, 209
See application file for complete search history.

(56) References Cited

U.S. PATENT DOCUMENTS 3,007,227 A * 11/1961 Moler ........................... 442/184
4,585,035 A    4/1986 Piccoli
(Continued)

FOREIGN PATENT DOCUMENTS

DE    42 32 946 A1    4/1993
DE    10 2004 051 073 A1    5/2006
(Continued)

OTHER PUBLICATIONS

Complete Textile Glossary, by Celanese Acetate LLC, 2001. (http://www.composites.ugent.be/home_made_composites/documentation/Illustrated_dictionary_of_fiber_and_textile_technology.pdf).*

(Continued)

*Primary Examiner* — Michael C Miggins
(74) *Attorney, Agent, or Firm* — Walter Ottesen, P.A.

(57) ABSTRACT

An article composed of a polymeric material, especially a material having elastic properties, which has been provided with an embedded reinforcement made wholly or partly of a textile material. In a first reinforcement variant, the textile material is polyoxadiazole (POD), a POD derivative or a POD copolymer, or, in a second reinforcement variant, the textile material is a combination of POD, a POD derivative or a POD copolymer, and at least one further textile material, or, in a third reinforcement variant, the textile material comprises a material combination of POD, a POD derivative or a POD copolymer and at least one further material which is not part of any textile group. The article is particularly a hose and more particularly a charge-air hose having an inner layer and an outer layer of a polymeric material and an embedded reinforcement, for example in the form of a POD knit.

15 Claims, 2 Drawing Sheets

(51) Int. Cl.
  *B32B 1/08* (2006.01)
  *B29C 70/08* (2006.01)
  *F16L 11/02* (2006.01)
  *C08J 5/04* (2006.01)
  *F02B 33/44* (2006.01)
  *F16L 11/08* (2006.01)
  *D03D 1/00* (2006.01)
  *D03D 19/00* (2006.01)
  *D04B 21/00* (2006.01)
  *D04C 1/02* (2006.01)
  *D04H 13/00* (2006.01)
  *F02M 35/10* (2006.01)
  *C08K 7/02* (2006.01)

(52) U.S. Cl.
  CPC  *C08J5/046* (2013.01); *C08J 5/047* (2013.01); *F02B 33/44* (2013.01); *F02M 35/10091* (2013.01); *F02M 35/10157* (2013.01); *F02M 35/10334* (2013.01); *F16L 11/08* (2013.01); *F16L 11/082* (2013.01); *F16L 11/085* (2013.01); *D03D 1/00* (2013.01); *D03D 19/00* (2013.01); *D04B 21/00* (2013.01); *D04C 1/02* (2013.01); *D04H 13/00* (2013.01); *C08K 7/02* (2013.01)

(56) References Cited

U.S. PATENT DOCUMENTS

| | | | | |
|---|---|---|---|---|
| 4,668,319 | A * | 5/1987 | Piccoli | 156/149 |
| 6,009,911 | A | 1/2000 | Friederich et al. | |
| 6,774,162 | B1 | 8/2004 | Vortkort et al. | |
| 7,528,217 | B2 | 5/2009 | Lee et al. | |
| 7,950,420 | B2 | 5/2011 | Amma et al. | |
| 2009/0236004 | A1 | 9/2009 | Jani et al. | |
| 2009/0320952 | A1 * | 12/2009 | Amma et al. | 138/126 |

FOREIGN PATENT DOCUMENTS

| | | |
|---|---|---|
| DE | 10 2006 058 470 A1 | 6/2008 |
| DE | 10 2008 014 988 A1 | 9/2009 |
| EP | 0 567 115 A1 | 10/1993 |
| EP | 0 895 015 A1 | 2/1999 |
| EP | 1 396 670 A1 | 3/2004 |
| EP | 1 941 150 B1 | 7/2008 |
| RU | 2 213 814 C2 | 10/2003 |
| RU | 2 213 815 C2 | 10/2003 |

OTHER PUBLICATIONS

International Search Report dated Jul. 15, 2011 of international application PCT/EP2011/058019 on which this application is based.

* cited by examiner

ARTICLE, MORE PARTICULARLY HOSE, MORE PARTICULARLY AGAIN CHARGE-AIR HOSE, WITH AN EMBEDDED REINFORCEMENT BASED ON A POLYOXADIAZOLE

CROSS REFERENCE TO RELATED APPLICATIONS

This application is a continuation application of international patent application PCT/EP 2011/058019, filed May 18, 2011, designating the United States and claiming priority from German application 10 2010 017 679.6, filed Jul. 1, 2010, and the entire content of both applications is incorporated herein by reference.

FIELD OF THE INVENTION

The invention relates to an item made of a polymeric material which has embedded reinforcement, entirely or to some extent consisting of a textile material.

BACKGROUND OF THE INVENTION

Items of this type based on composite materials are by way of example hose-shaped structures, in particular hoses and air spring bellows, drive belts, conveyor belts, and flexible containers. Among this group of items, particular mention may be made of hoses, where these consist of an internal layer and external layer and of embedded single- or multiple-ply reinforcement, and also optionally of further layers, for example of a diffusion-barrier layer. In this connection, reference is made in particular to the following patent literature: DE 42 32 946 C2, DE 10 2004 051 073 A1, DE 10 2008 014 988 A1, EP 0 567 115 B1, U.S. Pat. No. 6,009,911, EP 0 895 015 B1, EP 1 396 670 E1, EP 1 941 150 B1 and United States patent application publication 2009/0236004 A1.

In practical applications, items of the generic type use various types of reinforcement that reliably withstand the respective demands in relation to pressure and/or temperature and/or dynamic stresses and/or solvents, over the necessary service life. Materials that may be mentioned in relation to textile reinforcement are by way of example polyamides, aramids, and polyesters. The reinforcement bonded into the polymer matrix, for example into an as yet unvulcanized rubber mixture, for producing items based on elastomers or thermoplastic elastomers, or into a molten plastic, for producing thermoplastic items, is achieved in a very wide variety of forms, for example in the form of fibers, yarns, cords, and filaments, or else in the form of sheet-like structures which in turn by way of example can be knitted fabrics, non-wovens, woven fabrics, and braided fabrics. Finally, the reinforcement is bonded into the material by way of the vulcanization process or another hardening process.

The hoses in particular are utilized in a wide range of applications involving different requirements, and the decision to use any particular reinforcement here is always taken after assessment of suitability and costs.

Particularly stringent requirements are placed upon hoses used in the air-intake region of supercharged internal combustion engines (EP 1 396 670 B1), and therefore on the reinforcement in these hoses. Further details of the prior art relevant here are given hereinafter.

Supercharged engines are constantly increasing in popularity in the market because this technology can achieve significant improvement not only in fuel economy but also in exhaust-gas quality in accordance with EU Standard. The technical principle can be described in its simplest form as follows: the air needed for the combustion process is compressed by way of a supercharger in order to increase the absolute content of oxygen, which makes up only about 21% of atmospheric air. The compressed air is then cooled by way of a charge-air cooler and then forced into the combustion chamber. The mounting of the charge-air cooler is located on the vehicle body, separate from the engine, and the charge-air hoses that connect the charge-air cooler to the system therefore have to withstand high pressure and thermal stresses. Under running conditions, furthermore the substantial relative movements of engine and vehicle body also subject them to permanent dynamic stress due to a wide variety of spatial deflections in all possible directions. Processes that occur in the actual charge-air system are not only compression and transport of air but also deposition of fuel residues and lubricant admixtures within the piping, and the polymer material has to withstand these over the service life of an automobile.

In principle, the materials to be used can be varied as required by the usage conditions, but specifically for reinforcement hitherto only a restricted selection has been available, for high temperatures in conjunction with high pressure. Applications of this type generally use yarns/twisted yarns based on meta-aramid.

SUMMARY OF THE INVENTION

The invention is now based on the object of providing an item of the generic type, in particular a hose, and in particular in turn a charge-air hose, which withstands high dynamic stresses at high temperatures and pressures and also has a long lifetime.

The object is achieved in that in the case of a first reinforcement variant, the textile material consists of polyoxadiazole (POD) and/or of a POD derivative and/or of a POD copolymer, or in the case of a second reinforcement variant, the textile material is a textile material combination comprising POD and/or a POD derivative and/or a POD copolymer, and also at least one further textile material which does not derive from the abovementioned POD group, or in the case of a third reinforcement variant, the textile material comprises a material combination comprising POD and/or a POD derivative and/or a POD copolymer, and also at least one further material which does not derive from a textile group.

These three POD-based reinforcement variants are described in more detail hereinafter with reference to preferred embodiments.

First Reinforcement Variant

For the purposes of this reinforcement variant, only POD, or only a POD derivative, for example a sulfonated POD, or only a POD copolymer, or a combination within the abovementioned POD group, is used. Particular importance here is attached to the exclusive use of POD.

In relation to details of the POD material, in particular relating to chemistry, reference is made in particular to the following patent literature: U.S. Pat. No. 7,528,217 B2, RU 2213814 C2 and RU 2213815 C2.

Second Reinforcement Variant

In the case of this reinforcement variant, the textile material is a material combination (hybrid) consisting of POD and/or of a POD derivative and/or of a POD copolymer, and also of at least one further textile material which does not derive from the abovementioned POD group. Particular importance here is attached to hybrid formation from POD with at least one other textile material.

The further textile material which does not derive from the POD group can be a synthetic or natural polymer. In particular, the following types of material are used:
- polyamide (PA), for example, PA6, PA6.6, PA11, PA12, PA6.10, PA6.12, copolyamides
- polyester (PES)
- aramid, for example, meta-aramid (m-aramid), para-aramid (p aramid)
- rayon
- polyethylene. terephthalate (PET)
- cotton
- staple viscose
- polyvinyl alcohol (PVAL)
- polyvinyl acetal (PVA)
- polyether ether ketone (PEEK)
- polyethylene 2,6-naphthalate (PEN)
- polyphenylene
- polyphenylene oxide (PPO)
- polyphenylene sulfide (PPS)
- polyphenylene ether.

Combinations of the abovementioned types of material are also possible. Examples of hybrids of this type can be:
- POD/PA
- POD/m-aramid
- POD/PPS
- POD/PA/PPS.

The quantitative proportion of POD and/or of the POD derivative and/or of the POD copolymer within a textile hybrid system is from 50 to 90% by weight, in particular from 55 to 80% by weight.

Third Reinforcement Variant

In the case of this reinforcement variant, the textile material comprises a material combination (hybrid) consisting of a POD and/or of a POD derivative and/or of a POD copolymer, and also of at least one further material which does not derive from a textile group.

The further material which does not derive from any textile group can in particular be:
- metal fibers
- carbon fibers
- glass fibers
- basalt fibers.

Combinations of the abovementioned types of material are also possible. An example of a hybrid of this type can be:
- POD fibers/carbon fibers.

With respect to the quantitative proportion of POD and/or of the POD derivative and/or of the POD copolymer within a hybrid system of this type, reference is made to the second reinforcement variant.

The following advantageous design possibilities are also applicable in respect of the reinforcement material in the case of the first and/or second and/or third reinforcement variant:
The reinforcement can have been prepared so as to promote adhesion, for example by means of a coating process using resorcinol-formaldehyde latex (RFL).
The reinforcement material is present in a filamental form. In respect of the filamental form, the following variants may in particular be mentioned:
- monofil
- filament yarn spun from a polymer
- stretch-broken yarn produced from filament yarn, stressed to breakage point, filaments break at different lengths
- cord thread
- twisted thread
- staple fibers produced from filament yarns, uniformly chopped to defined length, then mechanically spun (for example, from 30 to 150 mm)
- short chopped fibers produced from filament yarns or stretch-broken yarns in lengths (for example, from 1 to 15 mm)
- pulp mostly in the form of fiber bundles or fiber tow (thick filament yarns).

When a twisted or other yarn is present the linear density (twist) is in particular from 1000 to 12 000 dtex.

The reinforcement material takes the form of a sheet-like structure, where in particular the following variants may be mentioned:
- woven fabric
- woven cord fabric
- ribbon
- knitted fabric
- laid scrim
- braided fabric
- nonwoven
- felt
- parallelized filaments.

The polymeric material of the item in particular possesses resilient properties, and in this connection the following two polymer variants are in particular used:

Polymer Variant A

The polymeric material is an elastomeric material based on a vulcanized rubber mixture which comprises an unblended rubber component or a rubber-component blend and conventional mixture ingredients. Particular rubber components that may be mentioned are:
- ethylene-propylene copolymer (EPM)
- ethylene-propylene-diene copolymer (EPDM)
- nitrile rubber (NBR)
- (partially) hydrogenated nitrile rubber (HNBR)
- fluoro rubber (FKM)
- chloroprene rubber (CR)
- natural rubber (NR)
- styrene-butadiene rubber (SBR)
- isoprene rubber (IR)
- butyl rubber (IIR)
- bromobutyl rubber (BIIR)
- chlorobutyl rubber (CIIR)
- butadiene rubber (BR)
- chlorinated polyethylene (CM)
- chlorosulfonated polyethylene (CSM)
- polyepichlorohydrin (ECO)
- ethylene-vinyl acetate rubber (EVA)
- acrylate rubber (ACM)
- ethylene-acrylate rubber (AEM)
- silicone rubber (MQ, VMQ, PVMQ, FVMQ; DE 10 2006 058 470 A1)
- fluorinated methylsilicone rubber (MFQ)
- perfluorinated propylene rubber (FFPM)
- perfluorocarbon rubber (FFKM)
- polyurethane (PU).

It is also possible to use a blend, in particular in conjunction with one of the abovementioned types of rubber, an example being an NR/BR blend.

Particular importance is attached to: EPM, EPDM, CR, NR, NBR, HNBR, CM, CSM, FKM, ACM, AEM, or silicone rubber.

The conventional mixture ingredients comprise at least one crosslinking agent or a crosslinking agent system (crosslinking agent and accelerator). Further mixture ingredients are mostly also a filler and/or a processing aid and/or a plasticizer and/or an antioxidant, and also optionally further additional materials (for example, color pigments). In this connection, reference is made to the general art of rubber mixture technology.

Polymer Variant B

The polymeric material is a thermoplastic vulcanisate (thermoplastic elastomer, abbreviated to TPE) comprising at least one thermoplastic component, at least one rubber component, which has been at least partially crosslinked, and also conventional mixture ingredients.

The preferred thermoplastic components are:
polyolefin, in particular polyethylene (PE) or polypropylene (PP)
polystyrene
polyamide (PA), for example PA6 or PA6.6 polyester (PES).

Particular rubber components that may be mentioned are EPM, EPDM, SBR, CR, NR, NBR, FKM, ACM, or AEM, which in particular have not been blended with any further rubber component.

In respect of the conventional mixture ingredients, reference is made to the mixture technology relating to polymer variant A, in particular to the teaching in U.S. Pat. No. 6,774,162.

The two polymer variants A and B are particularly important for hoses.

The novel reinforcement in the three reinforcement variants described in more detail is used in particular for the following items:

Hoses

In hoses, the reinforcement typically has been embedded completely in a polymeric material, in particular in the case of polymer variant A or B, and specifically with formation of an internal and external layer, and also optionally of one or more intermediate layer(s). The reinforcement in particular takes a filamental form, for example the form of cord threads or twisted threads. These threads run in the longitudinal direction of the hose mostly at a certain angle, for example 54 degrees, and specifically with formation of a crosslaid arrangement. The drawn-loop-knitted structure described in more detail in the context of the charge-air hoses is also important.

In some hoses, for example in chemicals hoses, it is possible to use not only the reinforcement as in the case of one of the three reinforcement variants but also a helical reinforcement made of steel and running mostly in the region of an additional intermediate layer (DE 10 2008 014 988 A1, United States patent application publication 2009/0236004 A1).

It is also possible to use an additional inliner in the form of a foil, for example a PA foil or PTFE foil (DE 10 2008 014 988 A1).

Hoses have a wide range of applications. Examples that may be mentioned here are water hose, high-pressure supply hose, compressed-air hose, compressor hose, autogenous hose, universal fuel gas hose, nitrogen hose, propane gas hose, coolant hose, fire-extinguisher hose, fuel hose, chemical-industry hose, pharmaceutical-industry hose, food-industry hose, steam hose, concrete- and mortar-transportation hose, dredge hose, floating hose, and vehicle hose.

A particular vehicle hose that may be mentioned is the charge-air hose.

Air Spring Bellows and Compensators

Air spring bellows and compensators use not only the crosslaid concept, as can be found in hoses, but also an axial arrangement of reinforcing filaments, specifically in axial bellows in vibration-control technology for cars, and also in torsion compensators. The reinforcement is mostly completely embedded in a polymeric material, in particular as in the case of polymer variant A, and specifically likewise with formation of an internal and external layer, and also optionally of one or more intermediate layer(s).

Drive Belts

Drive belts, and mention may be made here of flat belts, V-belts, V-ribbed belts, and toothed belts, use tension-member systems which are filamental in the running direction and in particular take the form of cord threads, these being completely embedded in a polymeric material, in particular as in the case of polymer variant A, and specifically with formation of a belt backing as outer ply and of a substructure with a force-transmission zone. The force-transmission zone here mostly has an additional textile covering (woven fabric, knitted fabric) for abrasion protection from abrasion. The textile covering is embedded to form a surface. The textile covering can also have a surface coating made of a polymeric material (for example, PTFE) for oil-resistance.

Drive belts can use the reinforcement as in one of the three reinforcement variants not only for the tension-member system but also for the textile covering. However, because of the comprehensive and successful development work carried out hitherto in the field of drive belts there is no need for the textile covers to make use of the novel design.

Conveyor Belts

In textile conveyor belts, warp threads and weft threads form a woven fabric completely embedded in a polymeric material, in particular as in the case of polymer variant A, and specifically with formation of an outer lamina on the load-bearing side and on the running side.

Multilayer Webs

In multilayer webs, for example for drinking-water containers, protective apparel, and connector bellows in vehicles, warp threads and weft threads form a woven fabric. This woven fabric can be completely embedded in a polymeric material, in particular as in the case of polymer variant A or B. Some applications, for example protective apparel, also use single-side embedding to form a surface.

The novel reinforcement as in the case of the first, second, or third reinforcement variant is in particular used in hoses, and in turn in particular in charge-air hoses.

Comparative experiments based on a charge-air hose will now be used to illustrate the importance of the novel reinforcement, and specifically with a more detailed study of the first reinforcement variant. The relevant experimental results are contained in the two Tables 1 and 2 below, and specifically in relation to:

comparison of reinforcement made of POD yarns and m-aramid yarns, using the following test criteria: elongation, loop strength, elongation at break, and maximum operating temperature (Table 1), and also comparison of residual strength in % of reinforcement made of POD yarns and m-aramid yarns after atmospheric aging with 24 h under controlled conditions of temperature and humidity (Table 2).

The reinforcement embedded between the internal layer and external layer here in each case took the form of drawn-loop-knitted fabric.

TABLE 1

| Test criteria | Unit | POD | m-Aramid |
|---|---|---|---|
| Extension under tensile load of 45 N | % | 1 | 1.1 |
| Loop strength | % | 88 | 75 |
| Elongation at break | % | 8.9 | 28.5 |
| Maximum operating temperature | ° C. | 260 | 250 |

When POD yarns are compared with m-aramid yarns under identical conditions, they feature somewhat lower extension, markedly higher loop strength, particularly markedly lower elongation at break, and also significantly higher heat resistance.

TABLE 2

| Material | Exposure time | 200° C. | 250° C. |
|---|---|---|---|
| POD | after 100 h | 99 | 105 |
|  | after 500 h | 100 | 100 |
|  | after 1000 h | 103 | 94 |
| m-Aramid | after 100 h | 101 | 99 |
|  | after 500 h | 100 | 91 |
|  | after 1000 h | 94 | 84 |

Even at 250° C., POD yarns have higher residual strength than m-aramid yarns.

Further experiments moreover gave the following results:

POD yarns also exhibit, in the region of initial extension, a modulus of elasticity which is low for the functional requirement and which ensures that in the anisotropic composite made of polymer plies, in particular elastomer plies, and drawn-loop-knitted insert, the elongations of all of the composite materials approximate to one another, thus inhibiting the occurrence, which is otherwise usual, of excessive interior stresses and resultant cracking.

When POD yarns are compared with m-aramid yarns, they are markedly thinner at identical strength, and unlike m-aramid yarns they can be knitted successfully in the high dtex range.

POD yarns exhibit significantly better adhesion to the polymer matrix and achieve by way of example about 8% higher separation load than m-aramid yarns under identical conditions in contact with silicone rubber.

POD yarns are also markedly less expensive than m aramid yarns, by virtue of a relatively simple production process.

In summary, the following substantial advantages can be determined in respect of the use of POD yarns in hoses, in particular in charge-air hoses:

They exhibit very good properties in relation to suitability.
They feature excellent processing properties.
They have marked cost advantages over m-aramid yarns.
When the abovementioned advantages are incorporated in trials, the lifetime of the hoses, in particular charge-air hoses, is about 30% higher.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
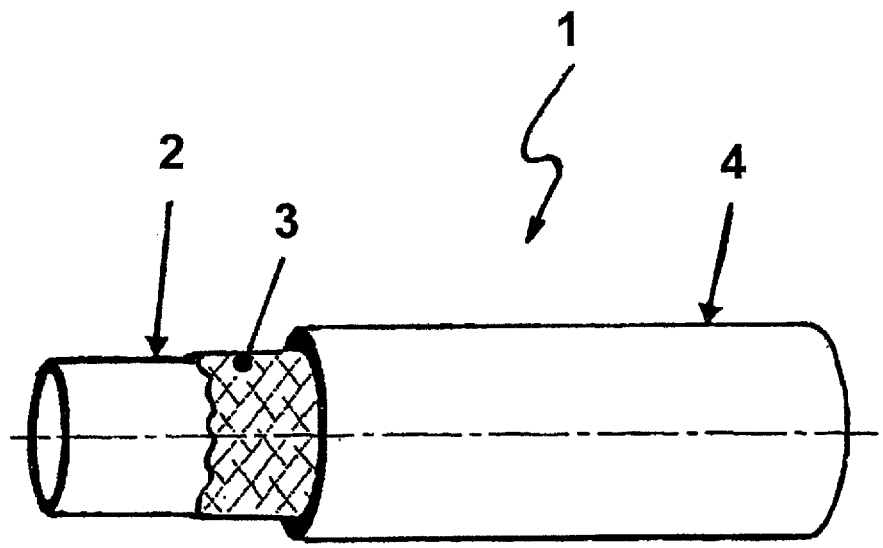
FIG. 1 shows a hose with embedded textile reinforcement.

In the case of FIG. 1, the hose 1 includes an internal layer 2 and external layer 4, in each case made of a polymeric material with resilient properties, for example as in the case of polymer variant A. There is textile reinforcement 3 embedded between the internal layer and external layer.

In charge-air hoses, the textile reinforcement made of POD takes the form of a drawn-loop-knitted insert embedded between the internal layer 2 and external layer 4 made of a vulcanized rubber mixture which, as required by temperature and other requirements, is based on CR, HNBR, FKM, AEM, ACM, or silicone rubber. The hose can if necessary have further internal and external layers of a very wide variety of polymer materials, in addition to the drawn-loop-knitted ply and the contiguous elastomer plies.

A charge-air hose is produced by the conventional process in which the individual plies are extruded in succession on an extrusion line in conjunction with a knitting machine, and the knitted insert is introduced at the intended position between the as yet unvulcanized rubber plies.

The vulcanization process is then carried out under the required conditions relating to temperature and time. The materials used in the process can be treated with adhesion promoters in order to improve bonding between the individual layers.

Figure 2:
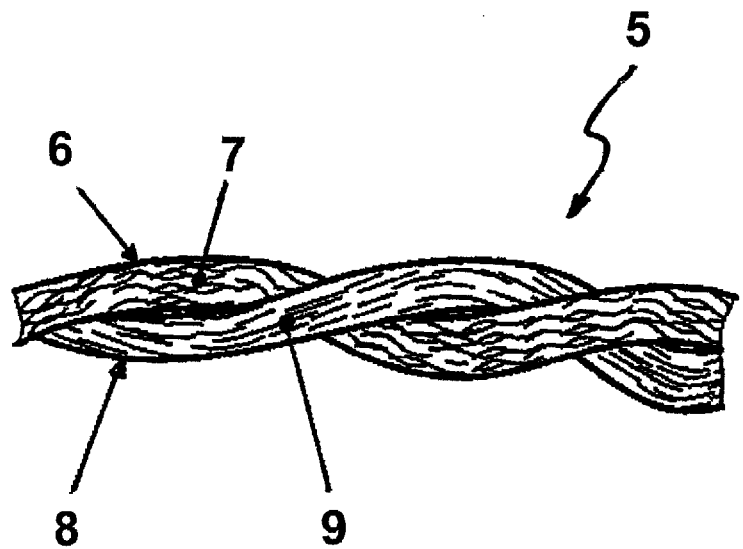
FIG. 2 shows a twisted thread 5; and,
FIG. 3 shows a twisted threat 10.

FIG. 2 shows a twisted thread 5, formed from a first thread 6 made of a first textile material 7 and a second thread 8 made of a second textile material 9. Two embodiments of this twisted structure are presented below.

The first textile material 7 and the second textile material 9 consist in each case of POD. The twisted thread 5 therefore consists of POD.

The first textile material 7 consists of POD and the second textile material 9 consists of PA, for example of PA6.6. The twisted thread 5 here therefore takes the form of twisted hybrid yarn, formed from the first thread 6 made of POD and the second thread 8 made of PA.

Figure 3:
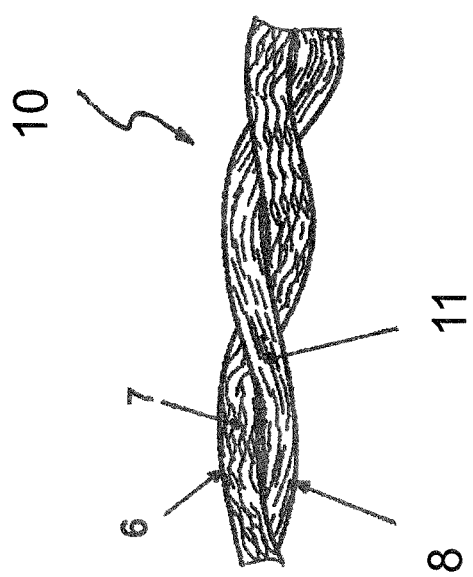

FIG. 3 shows a twisted threat 10, formed form a first thread 6 made of a first textile material 7 and a second thread 8 made of a further material 11 which does not derive from a textile group.

It is understood that the foregoing description is that of the preferred embodiments of the invention and that various changes and modifications may be made thereto without departing from the spirit and scope of the invention as defined in the appended claims.

KEY (Part of Description)
1 Hose
2 Internal layer (lining)
3 Reinforcement
4 External layer (sheathing, outer layer)
5 Twisted thread
6 First thread
7 First textile material
8 Second thread
9 Second textile material

What is claimed is:
1. An item made of a polymeric material having an embedded reinforcement, comprising a textile material, wherein
in the case of a first reinforcement variant, the textile material is selected from a POD group consisting of polyoxadiazole (POD), a sulfonated POD, and a POD copolymer, or a combination thereof, or
in the case of a second reinforcement variant, the textile material is a textile material combination comprising a member of the POD group consisting of POD, a sulfonated POD, and a POD copolymer, or a combination thereof, and also of at least one further textile material which does not derive from the POD group, or
in the case of a third reinforcement variant, the textile material comprises a material combination comprising a member of the POD group consisting of POD, a sul- fonated POD, and a POD copolymer, or a combination thereof, and also of at least one further material selected from the group consisting of metal fibers, carbon fibers, glass fibers, and basalt fibers, or a mixture thereof; and, wherein the item has a maximum operating temperature of 260° C.; and, wherein the member of the POD group is present in a continuous filamental form.

2. The item as claimed in claim 1, wherein, in the first reinforcement variant, the textile material consists of POD.

3. The item as claimed in claim 1, wherein, in the second reinforcement variant, the textile material is a textile material combination consisting of POD, and also of at least one further textile material which does not derive from the POD group.

4. The item as claimed in claim 1, wherein, in the third reinforcement variant, the textile material comprises a material combination consisting of POD, and also of the at least one further material selected from the group consisting of metal fibers, carbon fibers, glass fibers, and basalt fibers, or a mixture thereof.

5. The item as claimed in claim 1, wherein, in the second reinforcement variant, the further textile material which does not derive from the POD group is selected from the group of textile materials consisting of polyamide (PA), polyester (PES), aramid, rayon, polyethylene terephthalate (PET), cotton, staple viscose, polyvinyl alcohol (PVAL), polyvinyl acetal (PVA), polyether ether ketone (PEEK), polyethylene 2,6 naphthalate (PEN), polyphenylene, polyphenylene oxide (PPO), polyphenylene sulfide (PPS), and polyphenylene ether, or a combination thereof.

6. The item as claimed in claim 1, wherein, in the third reinforcement variant, the further material is selected from the group consisting of carbon fibers.

7. The item as claimed in claim 1, wherein, in the second or third reinforcement variant, the quantitative proportion of POD, the sulfonated POD, the POD copolymer or the combination thereof is from 50 to 90% by weight of the embedded reinforcement.

8. The item as claimed in claim 1, wherein the embedded reinforcement has been treated with an adhesion promoter.

9. The item as claimed in claim 1, wherein the continuous filamental form is a monofil, a filament yarn, a cord thread, or a twisted thread.

10. The item as claimed in claim 9, wherein the monofil, the filament yarn, the cord thread, or the twisted thread has a linear density from 1000 to 12 000 dtex.

11. The item as claimed in claim 1, wherein the embedded reinforcement takes the form of a sheet.

12. The item as claimed in claim 11, wherein the sheet is a woven fabric, woven cord fabric, a ribbon, a knitted fabric, a laid scrim, a braided fabric, a nonwoven, or a felt, or has been formed from parallelized filaments.

13. The item as claimed in claim 1, wherein the item is a hose, an air spring bellows, a compensator, a drive belt, a conveyor belt, or a multilayer web.

14. The item as claimed in claim 13, being a hose intended for pressure and/or dynamic and/or thermal stress.

15. The item as claimed in claim 14, wherein the item is a charge-air hose.

\* \* \* \* \*

UNITED STATES PATENT AND TRADEMARK OFFICE
CERTIFICATE OF CORRECTION

| | | |
|---|---|---|
| PATENT NO. | : 9,040,133 B2 | Page 1 of 1 |
| APPLICATION NO. | : 13/675815 | |
| DATED | : May 26, 2015 | |
| INVENTOR(S) | : H. Schubert et al. | |

It is certified that error appears in the above-identified patent and that said Letters Patent is hereby corrected as shown below:

In the Specification

In Column 1:
Line 36: delete "E1" and substitute -- B1 -- therefor.

In Column 3:
Line 10: delete "polyethylene." and substitute -- polyethylene -- therefor.

In Column 8:
Line 30: delete "threat" and substitute -- thread -- therefor.
Line 30: delete "form" and substitute -- from -- therefor.

Signed and Sealed this
Twenty-second Day of September, 2015

Michelle K. Lee
*Director of the United States Patent and Trademark Office*